(12) United States Patent
Yabusaki et al.

(10) Patent No.: US 8,452,843 B2
(45) Date of Patent: May 28, 2013

(54) DATA COMMUNICATION SYSTEM AND DATA COMMUNICATION DEVICE

(75) Inventors: Tatsumi Yabusaki, Nagoya (JP); Tomitsugu Sugimoto, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 12/995,957

(22) PCT Filed: Jun. 2, 2008

(86) PCT No.: PCT/JP2008/060162
§ 371 (c)(1),
(2), (4) Date: Dec. 2, 2010

(87) PCT Pub. No.: WO2009/147714
PCT Pub. Date: Dec. 10, 2009

(65) Prior Publication Data
US 2011/0093559 A1    Apr. 21, 2011

(51) Int. Cl.
*G06F 15/16* (2006.01)
(52) U.S. Cl.
USPC .......................................... 709/208; 709/223
(58) Field of Classification Search
None
See application file for complete search history.

(56) References Cited

U.S. PATENT DOCUMENTS

| | | | |
|---|---|---|---|
| 6,047,222 A | 4/2000 | Burns et al. | |
| 6,324,522 B2 | 11/2001 | Peterson et al. | |
| 6,484,206 B2 | 11/2002 | Crump et al. | |
| 6,742,136 B2 | 5/2004 | Christensen et al. | |
| 7,984,127 B2 * | 7/2011 | Douskalis et al. | 709/223 |
| 2002/0078208 A1 | 6/2002 | Crump et al. | |
| 2002/0083364 A1 | 6/2002 | Christensen et al. | |
| 2002/0123957 A1 | 9/2002 | Notarius et al. | |
| 2003/0103144 A1 * | 6/2003 | Sesek et al. | 348/207.1 |
| 2004/0008719 A1 * | 1/2004 | Ying | 370/460 |
| 2004/0213230 A1 | 10/2004 | Douskalis et al. | |
| 2006/0282506 A1 * | 12/2006 | Furuishi et al. | 709/208 |
| 2008/0123656 A1 | 5/2008 | Chen et al. | |

FOREIGN PATENT DOCUMENTS

| | | |
|---|---|---|
| CN | 1054870 A | 9/1991 |
| CN | 101141233 A | 3/2008 |
| JP | 5-252168 * | 9/1993 |
| JP | 5-252168 A | 9/1993 |
| JP | 09-219714 A | 8/1997 |
| JP | 10-210571 A | 8/1998 |
| JP | 2002-237823 A | 8/2002 |
| KR | 10-1991-0016168 A | 9/1991 |

OTHER PUBLICATIONS

Japanese Decision of a Patent Grant in corresponding Japanese Patent Application No. 2010-515684 dated Nov. 8, 2011.
Korean Office Action issued in corresponding Korean Application No. 10-2010-7027061, dated Jan. 16, 2012.
Chinese Office Action, Appln No. 200880129606.8, Nov. 26, 2012.
Taiwanese Office Action, Appln No. 97121857, Dec. 26, 2012.

* cited by examiner

*Primary Examiner* — Andrew L Nalven
*Assistant Examiner* — Mohammed Waliullah
(74) *Attorney, Agent, or Firm* — Sughrue Mion, PLLC

(57) ABSTRACT

A data communication system performs transmission and reception of data by token passing and updates data by an arithmetic process of data transmitted to and received from a slave station. The data communication system includes a management master station that updates data of slave stations, and a local station that updates data of slave stations. The management master station performs a data update when a token frame destined to the management master station is received, and the local station determines a destination of token frames transmitted from the slave stations, and performs a data update when a destination is the management master station.

8 Claims, 9 Drawing Sheets

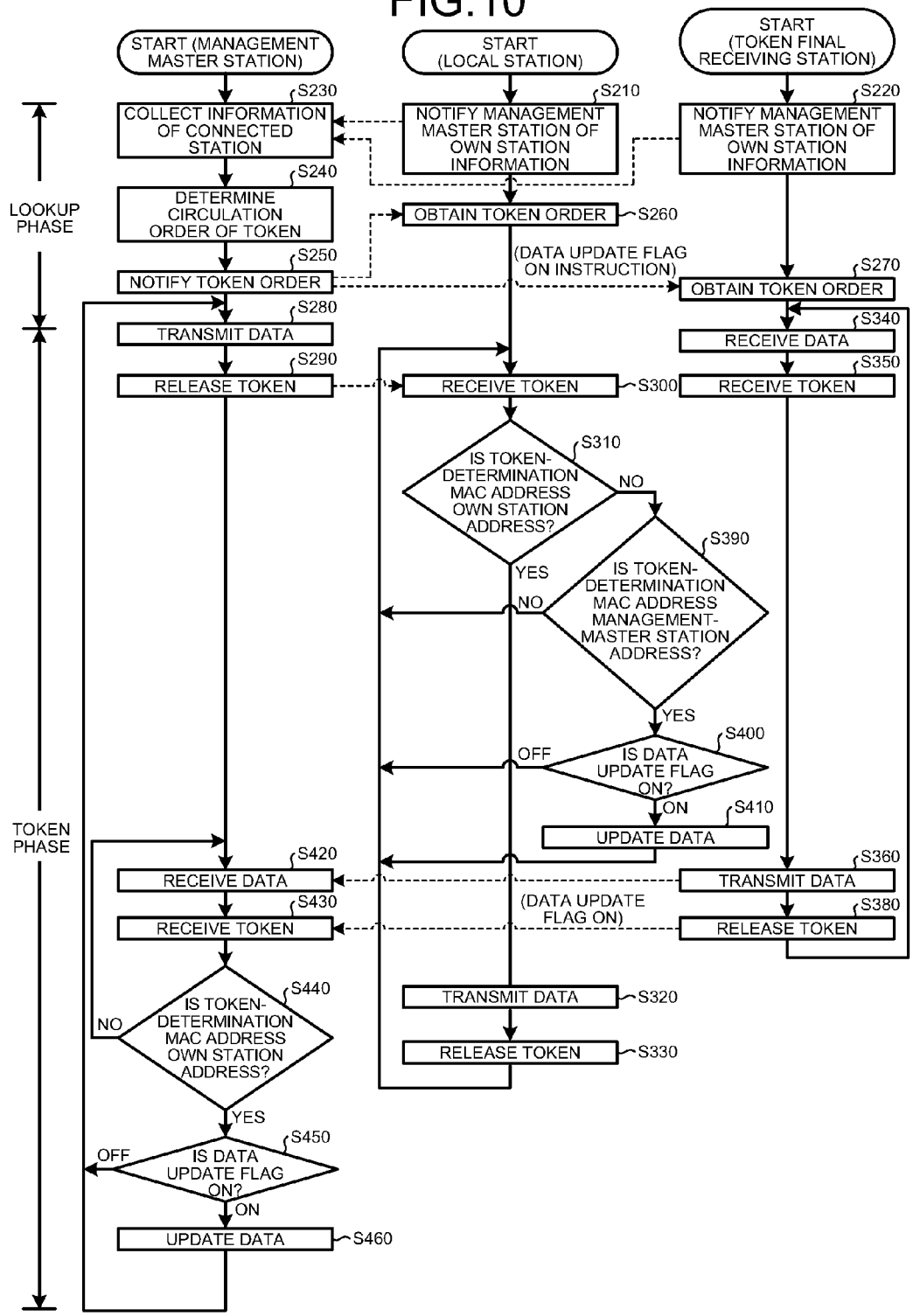

US 8,452,843 B2

DATA COMMUNICATION SYSTEM AND DATA COMMUNICATION DEVICE

TECHNICAL FIELD

The present invention relates to a data communication system and a data communication device that perform data communications between a master station and a slave station by token passing.

BACKGROUND ART

In a manufacturing field such as a factory, a communication system (a field network) is configured by connecting field devices such as a PLC (Programmable Logic Controller), an inverter, and a thermometer, and various processes are performed while performing data communications between the field devices. In such a communication system, token passing using a LAN (Local Area Network) specification such as Ethernet® techniques is employed, for example, so as to guarantee the realtime property of data communications performed between the field devices. In recent years, because many field devices are connected to a communication system, it has been desired that data handled by the field devices is efficiently processed in a short time.

For example, in a data link method described in Patent Document 1, two master stations are provided in a data link system. The master stations perform data communications with local stations under their control.

Patent Document 1: Japanese Patent Application Laid-open No. H5-252168

DISCLOSURE OF INVENTION

Problem to be Solved by the Invention

However, according to the conventional technique described above, each of the master stations performs a data update (data processing) at a timing when each of the stations receives a token, and thus the master stations update data asynchronously. Therefore, there occurs a time lag in data updates performed by the master stations with respect to the state of the entire system.

A time of an update interval (link scan) of a data update performed by each of the master stations includes a total time of a data update process. For example, when two master stations are provided in a communication system, an update interval time of data updates performed by one master station includes a data-update processing time of two master stations (a data-update processing time of the own master station and a data-update processing time of the other master station). Therefore, an update interval of data updates performed by each of the master stations becomes long, and thus each of the master stations cannot complete data communications with local stations in a short time.

The present invention has been achieved in view of the above problems, and an object of the present invention is to obtain a data communication system and a data communication device capable of updating data at an efficiently operable and appropriate timing and also capable of performing data communications in a communication system in a short time.

Means for Solving Problem

In order to solve the above problem and in order to attain the above object, in a data communication system including a master station that performs transmission and reception of data to and from a slave station by token passing using multicast communications and performs a data update of the data by an arithmetic operation of data transmitted and received to and from the slave station, and the slave station, the data communication system of the present invention includes the master station having a first master station that performs management in the data communication system and updates data of a predetermined slave station and a second master station that updates data of a slave station that is different from a slave station of which data the first master station updates. Additionally, the first and second master stations update data when a token frame destined to the first master station is received from the slave station.

Effect of the Invention

The data communication system according to the present invention can update data at an efficiently operable and appropriate timing and can perform data communications within a communication system in a short time.

BRIEF DESCRIPTION OF DRAWINGS

FIG. 10 is a flowchart of an operation procedure of the data communication system according to the second embodiment.

Figure 1:
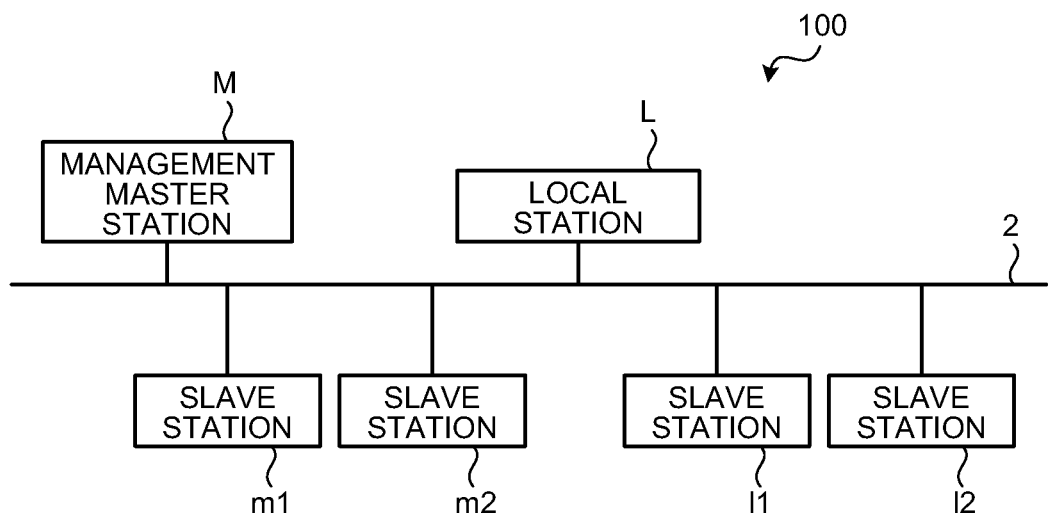
FIG. 1 depicts a configuration of a data communication system according to a first embodiment.

EXPLANATIONS OF LETTERS OR NUMERALS 11 data-update processing unit
12 data transmitting/receiving unit
13 management-master-address storage unit
14 MAC-address determining unit
15 data-update-flag determining unit
100 data communication system
11, 12, m1, m2 slave station
L local station
M management master station

BEST MODE(S) FOR CARRYING OUT THE INVENTION

Exemplary embodiments of a data communication system and a data communication device according to the present invention will be explained below in detail with reference to the accompanying drawings. The present invention is not limited to the embodiments.

First Embodiment

FIG. 1 depicts a configuration of a data communication system according to a first embodiment. A data communication system 100 includes a management master station (a first master station) M, a local station (a second master station) L, and slave stations m1, m2, l1, and l2, as communication devices (nodes). In the data communication system 100, the management master station M, the local station L, and the slave stations m1, m2, l1, and l2 are connected on a transmission path (a bus 2), thereby performing data communications with each other via the transmission path. There is explained a case that slave stations under control of the management master station M are the slave stations m1 and m2, and slave stations under control of the local station L are the slave stations l1 and l2.

In the data communication system 100 according to the present embodiment, the management master station M and the local station L update data (perform arithmetic processing of data received from slave stations) at the same timing. The data communication system 100 performs data communications (transmission and reception of an Ethernet® frame) between stations (the management master station M, the local station L, and the slave stations m1, m2, l1, and l2) by token passing by using a LAN standard of Ethernet® techniques.

The management master station M, the local station L, and the slave stations m1, m2, l1, and l2 are computers such as field devices. The management master station M is a network unit arranged in a PLC (Programmable Logic Controller) or the like, and performs processing of data transmitted from the slave stations m1 and m2 under control of the management master station M, and performs management in the data communication system 100.

The local station L performs processing of data transmitted from the slave stations l1 and l2 under its control. The slave stations m1, m2, l1, and l2 are arranged in peripheral devices (not shown) such as an I/O device and a digital/analog conversion device, respectively, and transmit operation instructions from the management master station M and the local station L to these peripheral devices.

In the data communication system 100, the slave stations m1 and m2 operate peripheral devices by using data from the management master station M, and the slave stations l1 and l2 operate peripheral devices by using data from the local station L. The slave stations m1 and m2 transmit data obtained from peripheral devices to which the slave stations m1 and m2 are connected, to the management master station M. The slave stations l1 and l2 transmit data obtained from peripheral devices to which the slave stations l1 and l2 are connected, to the local station L.

The management master station M and the local station L perform a predetermined operation by using data from the slave stations m1, m2, l1, and l2, and generate data to the slave stations m1, m2, l1, and l2. The management master station M and the local station L transmit the generated data to the slave stations m1, m2, l1, and l2. The data communication system 100 operates by repeating a data communication process performed between the management master station M and the slave stations m1 and m2, and a data communication process performed between the local station L and the slave stations l1 and l2.

In the data communication system 100, the management master station M determines an order of token frames (hereinafter, "token") flowing between stations, based on mainly a physical configuration (a connection configuration of stations).

Each of the stations in the data communication system 100 circulates a token following a token order (a circulation order of a token) determined by the management master station M. A MAC (Media Access Control) address (hereinafter, "token-determination MAC address") of a station to which a transmission right is given next is stored in a token that each of the stations transmits by multicast communications in the data communication system 100.

When each of the stations in the data communication system 100 receives a token destined to the own station (a token of which a token-determination MAC address is a MAC address of the own station), the station recognizes that the own station has acquired a transmission right, transmits data from the own station according to need, and issues a token to another station and assigns the next transmission station. In the data communication system 100, each of the stations performs this operation, and a token is circulated in the data communication system 100, thereby avoiding a congestion state of frames on the transmission path. Upon receiving the token, the management master station M recognizes reception of data from the slave stations m1 and m2, and updates the data. Upon receiving the token, the local station L recognizes reception of data from the slave stations l1 and l2, and updates the data. This data update is a process of performing a predetermined arithmetic process by using data received from the slave stations m1, m2, l1, and l2, and generating data to be transmitted to the slave stations m1, m2, l1, and l2. The data update also includes a process of exchanging transmission data to the network configured by the stations and reception data from the network with an arithmetic processing device such as a CPU unit.

The management master station M according to the present embodiment manages a topology and an order of tokens as management in the data communication system 100. The local station L can perform management in the data communication system 100 or does not have to perform the management.

Figure 2:
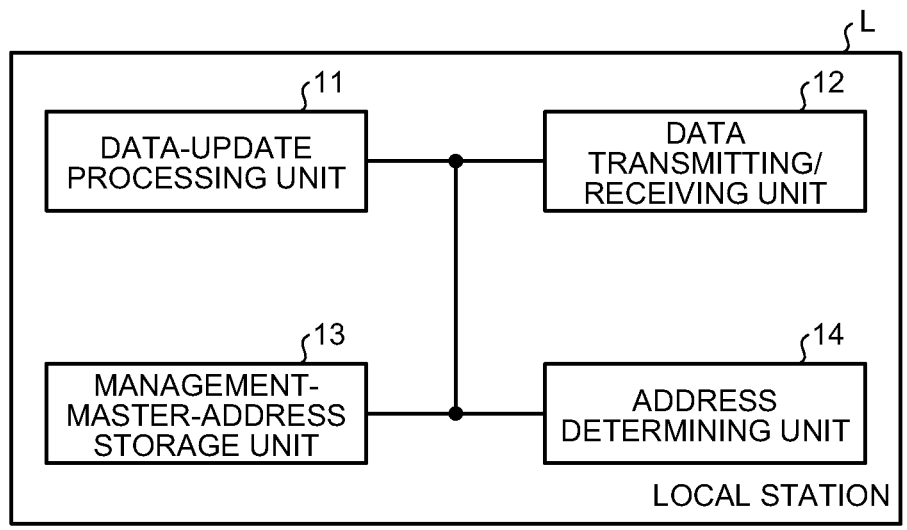
FIG. 2 is a block diagram of a configuration of a local station in the data communication system according to the first embodiment.

FIG. 2 is a block diagram of a configuration of a local station in the data communication system according to the first embodiment. As shown in FIG. 2, the local station L includes a data-update processing unit 11, a data transmitting/receiving unit 12, a management-master-address storage unit 13, and an MAC-address determining unit (a destination determining unit) 14. The local station L is configured by using an ASIC (Application Specific Integrated Circuit) and a microcomputer.

The data-update processing unit 11 performs a predetermined arithmetic process by using data received from the slave stations l1 and l2, and generates data to be transmitted to the slave stations l1 and l2 as a result of this performance. The data-update processing unit 11 in the present embodiment updates data at a timing corresponding to a result of a destination determination of a token by the MAC-address determining unit 14. The data-update processing unit 11 updates data when the MAC-address determining unit 14 determines that a destination of a token is the management master station M.

The data transmitting/receiving unit 12 transmits and receives data and a token to and from another station in the data communication system 100. Because slave stations under control of the local station L are the slave stations l1 and l2, the data transmitting/receiving unit 12 transmits and receives data to and from the slave stations l1 and l2. The management-master-address storage unit 13 stores a MAC address of the management master station M transmitted from the management master station M.

The MAC-address determining unit 14 determines a station to which a token is destined, based on a token-determination MAC address (update permission information) of a token transmitted from another station. The MAC-address determining unit 14 determines that a transmission right is acquired when a token of which a token-determination MAC address is a MAC address of the own station is received. The MAC-address determining unit 14 according to the present embodiment determines whether a token is transmitted to the management master station M, by comparing a MAC address of the management master station M stored in the management-master-address storage unit 13 with a token-determination MAC address of a token received from another station. The MAC-address determining unit 14 determines that this is a timing of updating data when a token of which a token-determination MAC address is a MAC address of the management master station M is received (when a MAC address stored in the management-master-address storage unit 13 matches a token-determination MAC address).

When a transmission right is acquired, the MAC-address determining unit 14 notifies the data transmitting/receiving unit 12 of the acquisition of a transmission right, and causes the data transmitting/receiving unit 12 to transmit data. When a data update timing comes, the MAC-address determining unit 14 notifies the data-update processing unit 11 of the coming of a data update timing, and causes the data-update processing unit 11 to update data.

Figure 3:
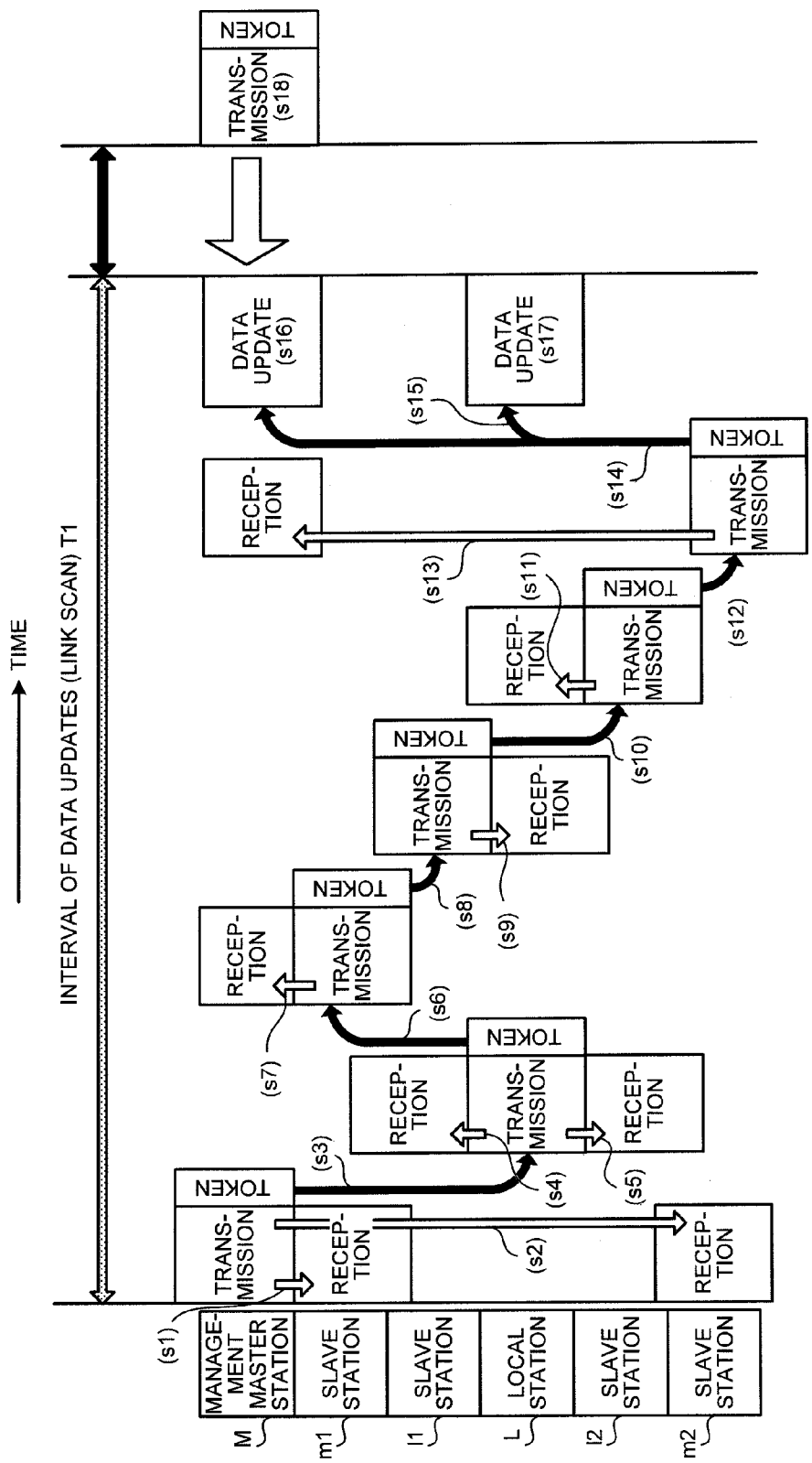
FIG. 3 is an explanatory diagram of a data update timing of the data communication system according to the first embodiment.

FIG. 3 is an explanatory diagram of a data update timing of the data communication system according to the first embodiment. In the present embodiment, there is explained a case that a token order is the management master station M, the local station L, the slave station m1, the slave station l1, the slave station l2, the slave station m2, the management master station M, . . . . In the data communication system 100, it is assumed that a station at a transmission side transmits by multicast communications data or a token of which a destination is assigned and that a station at a reception side receives only data necessary for the own station and discards data or tokens not necessary.

The management master station M transmits data to the slave stations m1 and m2 under its control, and the slave stations m1 and m2 receive the data from the management master station M (s1, s2). Upon completing the data transmission to the slave stations m1 and m2, the management master station M transmits a token to the local station L, and the local station L receives the token from the management master station M (s3).

The local station L according to the present embodiment does not update data when a token is received from the management master station M, and performs the next process. Upon receiving the token from the management master station M, the local station L transmits data to the slave stations l1 and l2 under its control, and the slave stations l1 and l2 receive the data from the local station L (s4, s5). Upon completing the data transmission to the slave stations l1 and l2, the local station L transmits a token to the slave station m1, and the slave station m1 receives the token from the local station L (s6).

The slave station m1 transmits data to the management master station M, and the management master station M receives the data from the slave station m1 (s7). Upon completing the data transmission to the management master station M, the slave station m1 transmits a token to the slave station l1, and the slave station l1 receives the token from the slave station m1 (s8).

The slave station l1 transmits data to the local station L, and the local station L receives the data from the slave station l1 (s9). Upon completing the data transmission to the local station L, the slave station l1 transmits a token to the slave station l2, and the slave station l2 receives the token from the slave station l1 (s10).

The slave station l2 transmits data to the local station L, and the local station L receives the data from the slave station l2 (s11). Upon completing the data transmission to the local station L, the slave station l2 transmits a token to the slave station m2, and the slave station m2 receives the token from the slave station l2 (s12).

The slave station m2 transmits data to the management master station M, and the management master station M receives the data from the slave station m2 (s13). Upon completing the data transmission to the management master station M, the slave station m2 transmits a token to the management master station M, and the management master station M receives the token from the slave station m2 (s14). The local station L according to the present embodiment monitors a token transmitted from another station. The local station L determines whether a destination of a token transmitted from another station is the management master station M. The token transmitted from the slave station m2 to the management master station M in the process of s14 is transmitted by multicast communications in a similar manner to that of another token. Therefore, this token is also transmitted to the local station L. The local station L determines whether a token transmitted by the slave station m2 is a token to the management master station M (a destination of the token).

Figure 4:
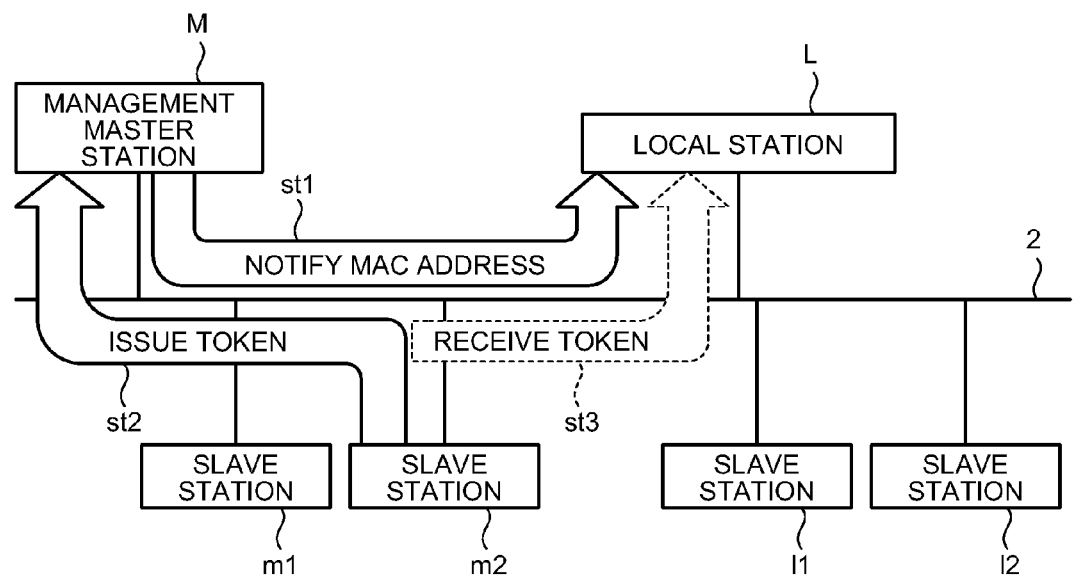
FIG. 4 is an explanatory diagram of a method of determining a destination of a token by a local station.

A method of determining a destination of a token by the local station L is explained next. FIG. 4 is an explanatory diagram of the method of determining a destination of a token by the local station L. In the data communication system 100, the management master station M notifies the local station L of a MAC address of the management master station M in advance (st1).

The local station L receives via the data transmitting/receiving unit 12 the MAC address transmitted from the management master station M. The management-master-address storage unit 13 stores the MAC address received by the data transmitting/receiving unit 12, as the MAC address of the management master station M.

Thereafter, when the slave station m2 issues a token to the management master station M (st2), the local station L receives the token from the slave station m2 via the data transmitting/receiving unit 12 (st3). The data transmitting/receiving unit 12 transmits the received token to the MAC-address determining unit 14.

The MAC-address determining unit 14 compares a token-determination MAC address within the token received by the data transmitting/receiving unit 12 with a MAC address of the management master station M stored in the management-master-address storage unit 13, thereby determining whether the token from the slave station m2 is a token to the management master station M.

Upon receiving the token from the slave station m2 (s15), the management master station M updates data (s16). The local station L updates data when it is determined that a token transmitted by the slave station m2 is a token to the management master station M (s17). Specifically, the data-update processing unit 11 updates data when the MAC-address determining unit 14 of the local station L determines that a destination of the token is the management master station M.

Accordingly, the data update by the management master station M and the data update by the local station L are performed at approximately the same timing. As explained above, in the data communication system 100, the management master station M and the local station L synchronously update data when a token is transmitted to the management master station M.

The management master station M performs the next data transmission after updating the data (s18). The process of s18 corresponds to the process of s1. Thereafter, in the data communication system 100, processes identical to those of s1 to s17 are repeatedly performed.

An interval T1 of data updates (link scan) by the data communication system 100 is a time from the process of s1 by the management master station M to the process of s16 by the management master station M. This data update interval T1 is shorter by a time (a processing time of s17) of a data update by the local station L than an interval of data updates performed when the local station L receives a token destined to the own station.

There is explained a difference between the interval of data updates performed when the local station L receives a token destined to the own station and the interval of the data updates T1 by the data communication system 100 according to the present embodiment. Explanations are made below while assuming that the interval of data updates performed when the local station L receives a token destined to the own station is a data update interval at an asynchronous processing time and that the interval of data updates by the data communication system 100 according to the present embodiment is a data update interval at a synchronous processing time.

Figure 5:
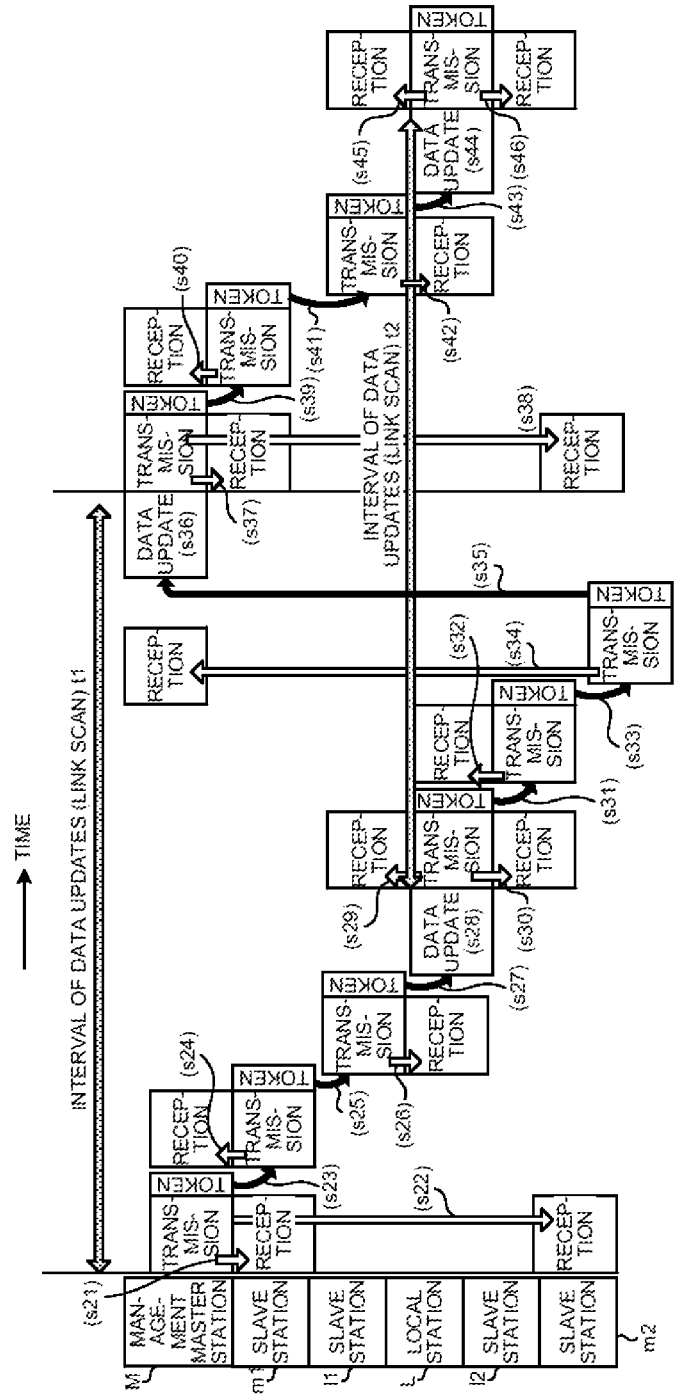
FIG. 5 is an explanatory diagram of a data update interval at an asynchronous processing time.

FIG. 5 is an explanatory diagram of a data update interval at an asynchronous processing time. FIG. 5 depicts a data update timing when the data communication system 100 performs asynchronous processing (when the local station L performs a data update upon receiving a token destined to the own station). There is explained a case that a token order is the management master station M, the slave station m1, the slave station l1, the local station L, the slave station l2, the slave station m2, the management master station M, . . . .

When the data communication system 100 performs asynchronous processing, the management master station M transmits data to the slave stations m1 and m2 under its control, and the slave stations m1 and m2 receive the data from the management master station M (s21, s22). Upon completing the data transmission to the slave stations m1 and m2, the management master station M transmits a token to the slave station m1, and the slave station m1 receives the token from the management master station M (s23).

The slave station m1 transmits data to the management master station M, and the management master station M receives the data from the slave station m1 (s24). Upon completing the data transmission to the management master station M, the slave station m1 transmits a token to the slave station l1, and the slave station l1 receives the token from the slave station m1 (s25).

The slave station l1 transmits data to the local station L, and the local station L receives the data from the slave station l1 (s26). Upon completing the data transmission to the local station L, the slave station l1 transmits a token to the local station L, and the local station L receives the token from the slave station l1 (s27).

The local station L updates data upon receiving the token from the slave station l1, when the data communication system 100 performs asynchronous processing (s28). Thereafter, the local station L transmits data to the slave stations l1 and l2 under its control, and the slave stations l1 and l2 receive the data from the local station L (s29, s30). Upon completing the data transmission to the slave stations l1 and l2, the local station L transmits a token to the slave station l2, and the slave station l2 receives the token from the local station L (s31).

The slave station l2 transmits data to the local station L, and the local station L receives the data from the slave station l2 (s32). Upon completing the data transmission to the local station L, the slave station l2 transmits a token to the slave station m2, and the slave station m2 receives the token from the slave station l2 (s33).

The slave station m2 transmits data to the management master station M, and the management master station M receives the data from the slave station m2 (s34). Upon completing the data transmission to the management master station M, the slave station m2 transmits a token to the management master station M, and the management master station M receives the token from the slave station m2 (s35).

Upon receiving the token from the slave station m2, the management master station M updates data (s36). After updating the data, the management master station M performs the next data transmission. That is, the management master station M transmits data to the slave stations m1 and m2, and the slave stations m1 and m2 receive the data from the management master station M (s37, s38). Upon completing the data transmission to the slave stations m1 and m2, the management master station M transmits a token to the slave station m1, and the slave station m1 receives the token from the management master station M (s39).

Thereafter, the data communication system 100 performs s40 to s46 as processes similar to those of s24 to s30. Thereafter, the data communication system 100 repeats processes identical to those of s29 to s44. That is, the data communication system 100 repeats the processes at plural times by performing the processes of s21 to s36 and the processes of s29 to s44 as data communications performed in one token circulation.

A data update interval t1 of the asynchronous processing by the management master station M is a time from the process of s21 by the management master station M to the process of s36 by the management master station M. A data update interval t2 of the asynchronous processing by the local station L is a time from the process of s29 by the local station L to the process of s44 by the local station L.

The data update interval t1 of the asynchronous processing by the management master station M includes a processing time of a data update by the management master station M (s36) and a processing time of a data update by the local station L (s28). The data update interval t2 of the asynchronous processing by the local station L includes a processing time of a data update by the local station (s44) and a processing time of a data update by the management master station M (s36). Therefore, the data update intervals t1 and t2 of the asynchronous processing have a longer interval time than the data update interval T1 of the asynchronous processing by the data communication system 100 according to the present embodiment.

Figure 6:
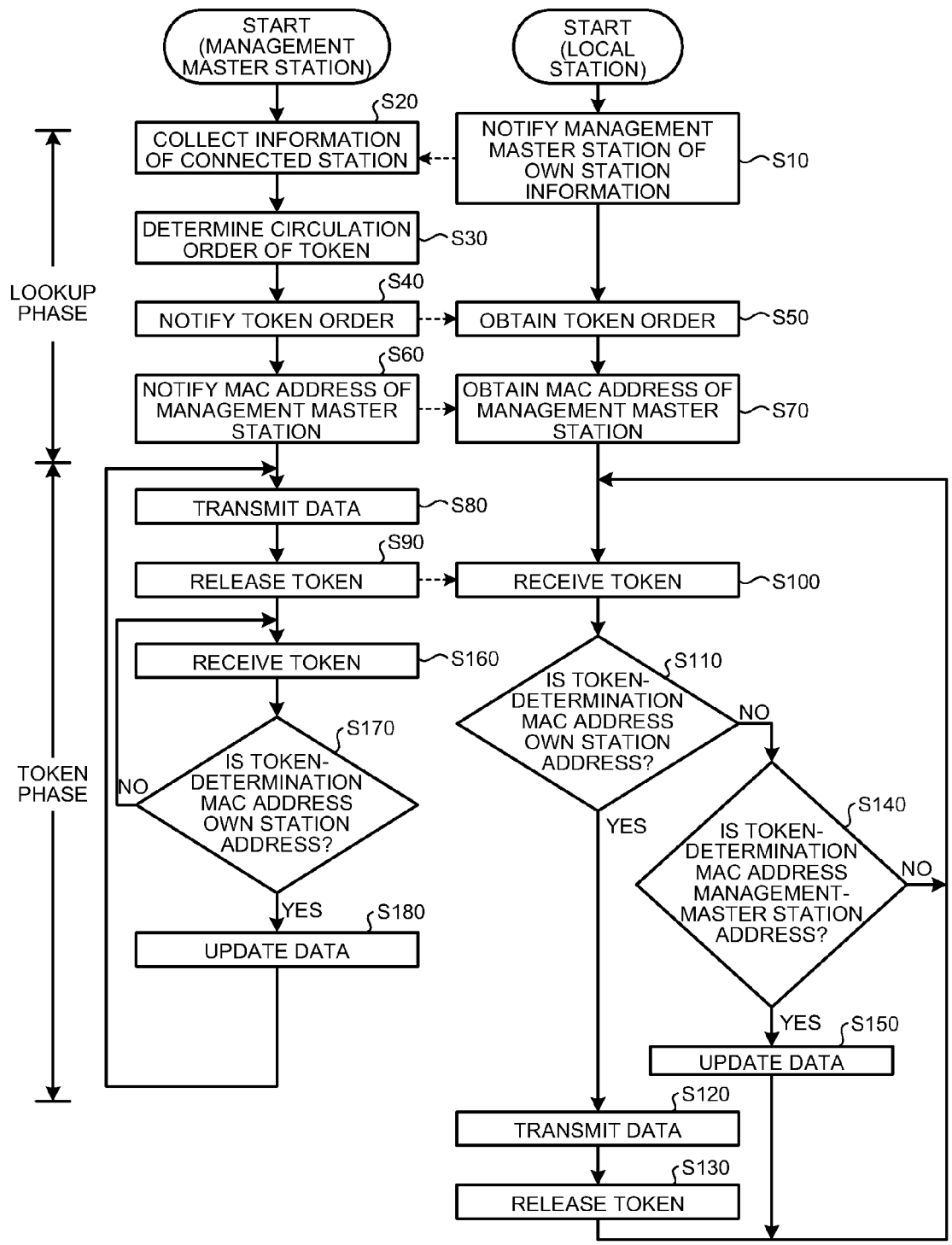
FIG. 6 is a flowchart of an operation procedure of the data communication system according to the first embodiment.

FIG. 6 is a flowchart of an operation procedure of the data communication system according to the first embodiment. FIG. 6 depicts the operation procedure of the management master station M and the local station L. The local station L transmits information (station information of the own station) concerning the local station L to the management master station M (Step S10). This station information includes information such as a MAC address of the local station L and a type of a communication protocol that can be used in the local station L.

The management master station M receives and collects station information of each station from the local station L and the slave stations m1, m2, l1, and l2 connected to the management master station M (Step S20). The management master station M determines a circulation order of a token based on the collected station information (Step S30).

In the present embodiment, the management master station M sets the local station L as a station to which a token is circulated earlier with priority than to other stations. For example, the management master station M sets the local station L as a station to which the management master station M first transmits a token, as a circulation order of a token.

With this arrangement, an order of data transmission and data reception by the management master station M and the local station L can be standardized as data transmission from the management master station M and the local station L, and data reception from the slave stations m1, m2, l1, and l2. Therefore, a time from when the management master station M and the local station L receive data from the slave stations m1, m2, l1, and l2 until when the management master station M and the local station L update data becomes short. Accordingly, the management master station M and the local station L can update data at an appropriate timing (a timing when the data communication system 100 can efficiently operate) corresponding to the state of the data communication system 100.

The management master station M notifies the local station L of the determined circulation order of a token (Step S40). The local station L receives and obtains the circulation order of a token (Step S50). The management master station M notifies the local station L of an MCA address of the management master station M (Step S60). The local station L receives and obtains the MCA address of the management master station M (Step S70). Processes at Steps S10 to S70 are a lookup phase (a process related to data fetching), and thus it suffices that the data communication system 100 performs this lookup phase once at the time of performing data communications.

After this lookup phase, the management master station M transmits data to the slave stations m1 and m2 (Step S80). The management master station M releases a token by transmitting the token to the local station L after completing the data transmission to the slave stations m1 and m2 (Step S90). The local station L receives the token from the management master station M (Step S100).

The MAC-address determining unit 14 of the local station L determines whether the received token is destined to the own station (the local station L) (Step S110). When the received token is destined to the own station (YES at Step S110), the data transmitting/receiving unit 12 of the local station L transmits data to the slave stations l1 and l2 (Step S120). Upon completing the data transmission to the slave stations l1 and l2, the local station L transmits a token to the slave station m1, thereby releasing the token (Step S130). Thereafter, the local station L waits for a token transmitted next.

On the other hand, when the received token is not destined to the own station (NO at Step S110), the MAC-address determining unit 14 of the local station L determines whether the token is destined to the management master station M. That is, the MAC-address determining unit 14 determines whether a token-determination MAC address of the received token is a MAC address of the management master station M (Step S140).

When the received token is not a MAC address of the management master station M (NO at Step S140), the local station L waits for a token transmitted next. When the received token is a MAC address of the management master station M (YES at Step S140), the data-update processing unit 11 of the local station L updates data (Step S150).

In the present embodiment, when the local station L receives a token transmitted from the slave station m2 to the management master station M, the local station L determines that the received token is not destined to the own station but is destined to the management master station M. Therefore, the local station L updates data when the local station L receives a token transmitted from the slave station m2 to the management master station M.

Upon completing the data update, the local station L waits for a token transmitted next. The local station L repeats the processes at Steps 100 to S150 each time when a token is received from another station (such as the management master station M and the slave station m2).

After releasing the token at Step S90, the management master station M waits for a token transmitted next. Upon receiving the token (Step S160), the management master station M determines whether a token-determination MAC address of the received token is a MAC address of the own station (the management master station M) (Step S170).

When the received token is not a MAC address of the management master station M (NO at Step S170), the management master station M waits for a token transmitted next. When a destination of a received token is a MAC address of the management master station M (YES at Step S170), the management master station M updates data (Step S180).

Because a token transmitted from the slave station m2 is destined to the management master station M, the management master station M updates data when the management master station M receives a token from the slave station m2. In a similar manner to that of the management master station M, the local station L also updates data when a token transmitted from the slave station m2 is destined to the management master station M. Therefore, the management master station M updates data (Step S180) at the same timing as that of the data update by the local station L (Step S150).

The management master station M can adjust time according to need at the time of updating data. For example, when a processing time of a data update performed by the local station L is longer than a processing time of a data update performed by the management master station M, the management master station M delays a start timing of a data update by a predetermined time such that a data update performed by the local station L and a data update performed by the management master station M are completed at the same timing. Accordingly, the local station L and the management master station M complete the data updates at the same time. Therefore, a starting of the next data transmission process by the management master station M without completing a data update by the local station L can be prevented. The management master station M stores in advance a processing time of data updates by the local station L and the management master station M, by measurement or by calculation, for example.

Upon completing the data update, the management master station M waits for a token transmitted next. The management master station M repeats the processes at Steps S160 to S180 and the processes at Steps S80 and S90 at each time of receiving a token from another station.

In the data communication system 100, after the lookup phase, the processes at Steps S100 to S150 by the local station L and the processes at Steps S80, S90, S160 to S180 by the management master station M are repeated as a token phase (a data communication process using a token).

In the present embodiment, while a case that the stations of the data communication system 100 are connected by line connection has been explained, stations of the data communication system 100 can be connected by star connection or by ring connection.

Figure 7:
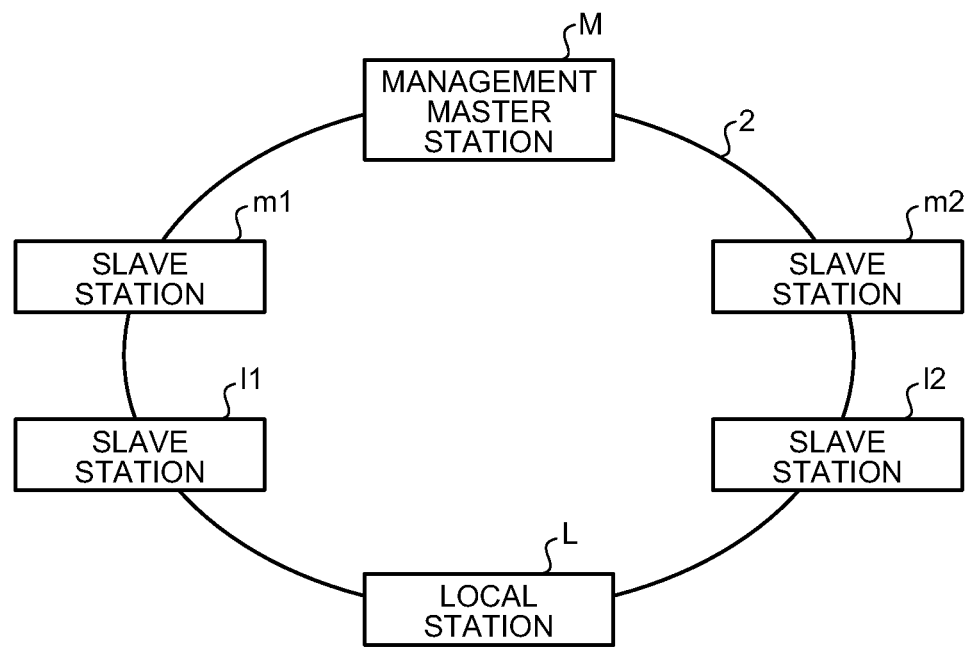
FIG. 7 depicts a configuration of a data communication system connected by ring connection.

When the stations of the data communication system 100 are connected by ring connection, the stations are connected by a connection configuration shown in FIG. 7, for example. FIG. 7 depicts a configuration of a data communication system connected by ring connection. As shown in FIG. 7, the data communication system 100 connected by ring connection constitutes a ring connection by a counterclockwise connection in the order of the management master station M, the slave station m1, the slave station l1, the local station L, the slave station l2, the slave station m2, and by connecting the slave station m2 with the management master station M.

In the present embodiment, although there has been explained a case that the data communication system 100 includes one local station L, the data communication system 100 can have plural local stations L. In the case of having plural local stations L, a data update by the management master station M and a data update by at least one local station L are performed at the same timing. For example, a data update by the management master station M and data updates by all local stations L can be performed at the same timing.

As explained above, according to the first embodiment, the local station L updates data at the timing when the management master station M updates data. Therefore, the management master station M and the local station L can synchronously update data in the data communication system 100. As a result, a data update can be performed at an appropriate timing. Data communications in the data communication system 100 can be performed in a short time, and control of a device connected to the slave stations m1, m2, l1, and l2 can be performed at a high speed.

Second Embodiment

A second embodiment of the present invention is explained next with reference to FIGS. 8 to 10. In the second embodiment, when a token is transmitted to the management master station M, the slave station m2 that issues the token to the management master station M transmits the token to the management master station M by adding information indicating a timing of a data update (information indicating a permission of a data update) to the token. The local station L and the management master station M update data only when information indicating a timing of a data update is added to a token among tokens to be transmitted to the management master station M.

Figure 8:
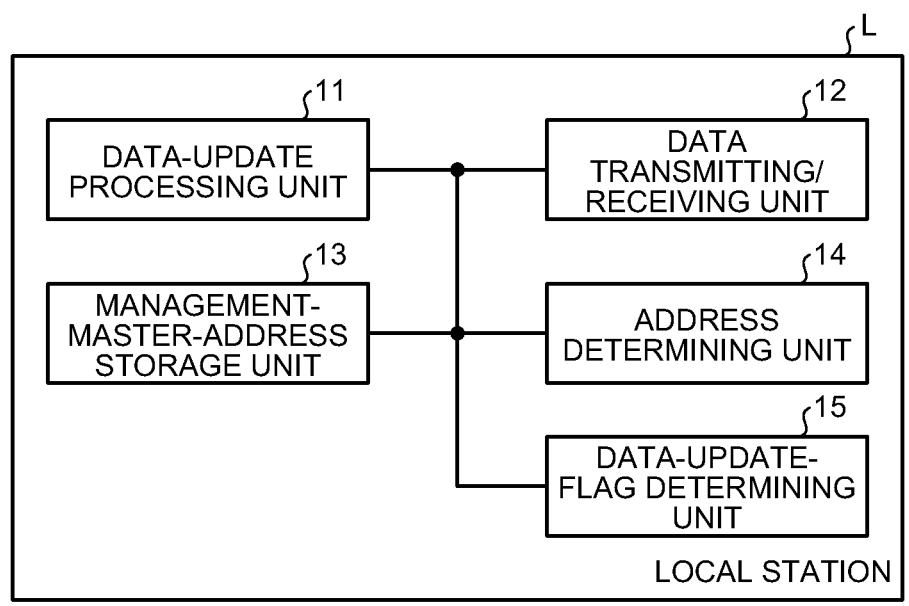
FIG. 8 is a block diagram of a configuration of a local station of a data communication system according to a second embodiment.
Figure 9:
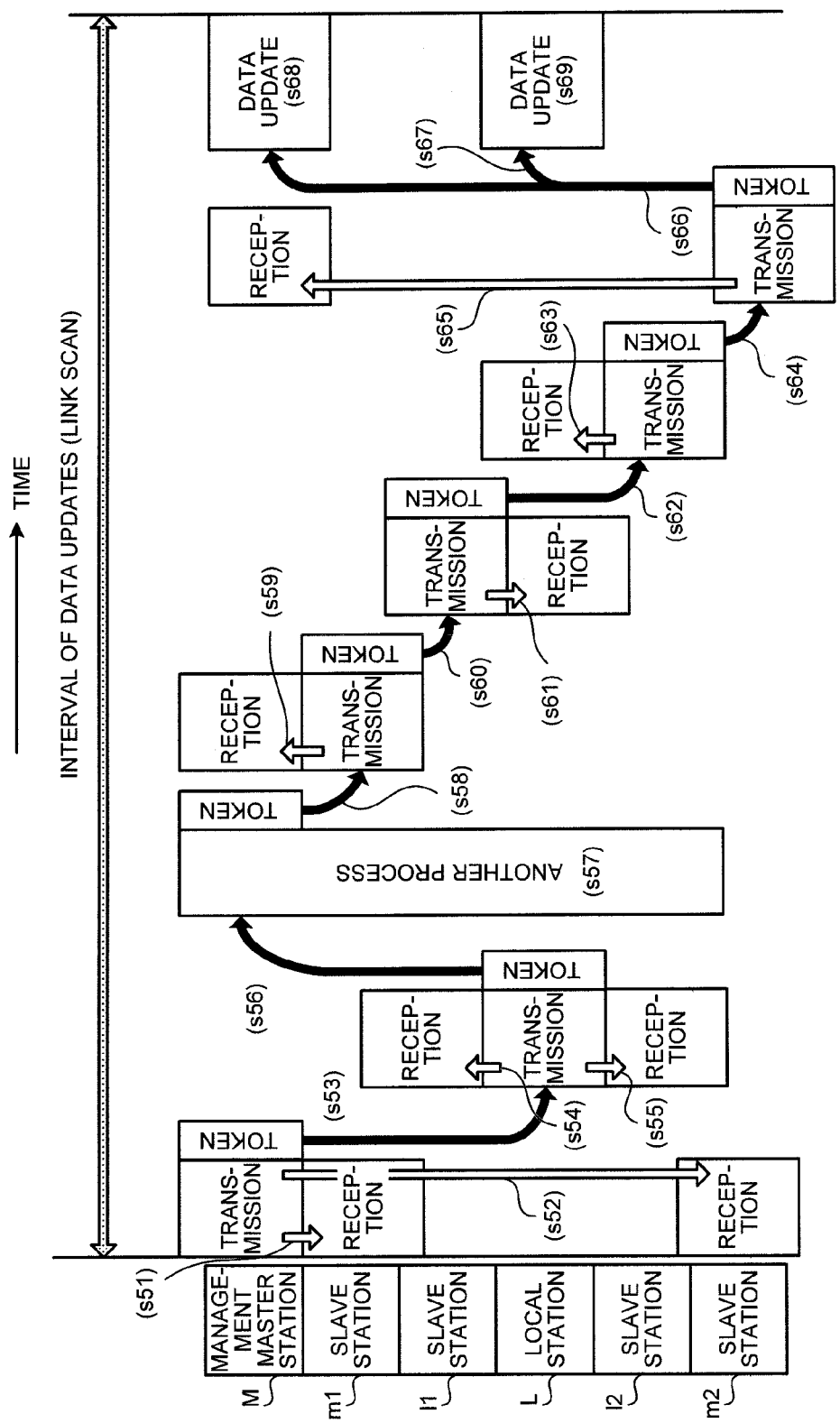
FIG. 9 is an explanatory diagram of a data update timing of the data communication system according to the second embodiment.

FIG. 8 is a block diagram of a configuration of a local station of a data communication system according to the second embodiment. Among the constituent elements shown in FIG. 8, elements that realize functions identical to those of the local station L shown in FIG. 2 are denoted by like reference numerals and explanations thereof will be omitted. As shown in FIG. 8, the local station L includes a data-update-flag determining unit (a permission determining unit) 15 in addition to the data-update processing unit 11, the data transmitting/receiving unit 12, the management-master-address storage unit 13, and the MAC-address determining unit 14.

The data-update-flag determining unit 15 determines whether a data update flag included in a token from another station is ON or OFF. The data update flag is information indicating whether this is a timing for the management master station M and the local station L to update data. The data update flag is set ON in only a token transmitted from the slave station m2 as a final receiving station of the token (a station receiving a token last in a token circulation) to the management master station M, and is set OFF in a token transmitted from other slave stations. When the data update flag is ON, the data-update-flag determining unit 15 determines that this is a data update timing. The data-update-flag determining unit 15 transmits a determination result of whether this is a data update timing to the data-update processing unit 11.

A data update timing of the data communication system according to the second embodiment is explained next. FIG. 9 is an explanatory diagram of a data update timing of the data communication system according to the second embodiment. Among processes performed by the data communication system 100, explanations of processes identical to those explained with reference to FIG. 3 will be omitted. In the present embodiment, there is explained a case that a token order is the management master station M, the local station L, the management master station M, the slave station m1, the slave station l1, the slave station l2, the slave station m2, the management master station M, . . . .

The management master station M instructs in advance only the slave station m2 of a final receiving station to set a data update flag ON when a token is transmitted to the management master station M. Thereafter, the management master station M transmits data to the slave stations m1 and m2 under its control, and the slave stations m1 and m2 receive the data from the management master station M (s51, s52). Upon completing the data transmission to the slave stations m1 and m2, the management master station M transmits a token to the local station L, and the local station L receives the token from the management master station M (s53).

The local station L according to the present embodiment does not update data when a token is received from the management master station M, and performs the next process. Upon receiving the token from the management master station M, the local station L transmits data to the slave stations l1 and l2 under its control, and the slave stations l1 and l2 receive the data from the local station L (s54, s55).

Upon completing the data transmission to the slave stations l1 and l2, the local station L transmits a token to the management master station M, and the management master station M receives the token from the local station L (s56).

The management master station M performs another process different from data transmission/reception (s57). The above mentioned another process is a process performed by realtime communications or the like, and is different from a process performed by token passing. The management master station M according to the present embodiment does not update data in a time given for another process.

After performing the above mentioned another process, the management master station M transmits a token to the slave station m1, and the slave station m1 receives the token from the management master station M (s58). The slave station m1 transmits data to the management master station M, and the management master station M receives the data from the slave station m1 (s59). Upon completing the data transmission to the management master station M, the slave station m1 transmits a token to the slave station l1, and the slave station l1 receives the token from the slave station m1 (s60).

The slave station l1 transmits data to the local station L, and the local station L receives the data from the slave station l1 (s61). Upon completing the data transmission to the local station L, the slave station l1 transmits a token to the slave station l2, and the slave station l2 receives the token from the slave station l1 (s62).

The slave station l2 transmits data to the local station L, and the local station L receives the data from the slave station l2 (s63). Upon completing the data transmission to the local station L, the slave station l2 transmits a token to the slave station m2, and the slave station m2 receives the token from the slave station l2 (s64).

The slave station m2 transmits data to the management master station M, and the management master station M receives the data from the slave station m2 (s65). Upon completing the data transmission to the management master station M, the slave station m2 transmits a token, in which a data update flag is set ON, to the management master station M, and the management master station M receives the token from the slave station m2 (s66). The local station L according to the present embodiment monitors a token transmitted from another station. The local station L determines whether a destination of a token transmitted from another station is the management master station M. The local station L further determines whether a data update flag included in a token transmitted from another station is ON or OFF.

The token transmitted from the slave station m2 to the management master station M in the process of s66 is transmitted by multicast communications in a similar manner to that of another token. Therefore, this token is also transmitted to the local station L (s67). The local station L determines whether a token transmitted by the slave station m2 is a token to the management master station M (a destination of the token), and also determines whether a data update flag is ON. In this case, the MAC-address determining unit 14 determines that the token transmitted by the slave station m2 is a token to the management master station M. The MAC-address determining unit 14 also determines that the data update flag is ON.

Upon receiving the token from the slave station m2, the management master station M updates data (s68). The local station L updates data when it is determined that the token transmitted by the slave station m2 is a token to the management master station M and that the data update flag is ON (s69). Specifically, the data-update processing unit 11 updates data when the MAC-address determining unit 14 of the local station L determines that a destination of the token is the management master station M and also when the data-update-flag determining unit 15 determines that the data update flag is ON. As a result, a data update by the management master station M and a data update by the local station L are performed at approximately the same timing.

In the present embodiment, the management master station M updates data only when a data update flag is ON. Therefore, the management master station M according to the present embodiment does not update data when a token is received from the local station L (s56). Although a case that the management master station M receives a token from the local station L and the slave station m2 is explained with reference to FIG. 9, a token can be transmitted from another station (a station other than the slave station m2) at plural times to the management master station M in the data communication system 100. In this case, when a data update flag is set ON in advance in only a token transmitted from the slave station m2, the management master station M does not update data even when a token is received from a station other than the slave station m2. As a result, in the data communication system 100, various token circulations (such as token transmission to the management master station M for many times) can be set as one token circulation. That is, in the data communication system 100, various intervals of data updates can be set. For example, as one token circulation, a token can be transmitted to the management master station M at three or more times.

As explained above, in the data communication system 100, when a token of which a data update flag is ON is transmitted to the management master station, the management master station M and the local station L synchronously update data. The management master station M performs the next data transmission after updating the data. Thereafter, processes identical to those of s51 to s69 are repeated in the data communication system 100.

FIG. 10 is a flowchart of an operation procedure of the data communication system according to the second embodiment, and depicts an operation procedure of the management master station M, the local station L, and the slave station m2 as a final receiving station of a token. Among the processes performed in the data communication system 100, explanations of processes identical to those in the data communication system 100 according to the first embodiment explained with reference to FIG. 6 will be omitted.

The local station L transmits station information of the own station to the management master station M (Step S210). The slave station m2 as a final receiving station of a token transmits station information of the own station to the management master station M (Step S220).

The management master station M receives and collects station information of each station from the local station L and the slave stations m1, m2, 11, and 12 connected to the management master station M (Step S230). The management master station M determines a circulation order of a token based on the collected station information (Step S240).

The management master station M notifies the local station L and the slave station m2 of the determined circulation order of a token (Step S250). The local station L receives and obtains the circulation order of a token (Step S260). The slave station m2 receives and obtains the circulation order of a token (Step S270).

Processes at Steps S210 to S270 are a lookup phase, and the data communication system 100 performs this lookup phase once at the time of performing data communications. Also in the present embodiment, the management master station M notifies in advance the local station L of a MAC address of the management master station M.

After this lookup phase, the management master station M transmits data to the slave stations m1 and m2 (Step S280). The management master station M releases a token by transmitting the token to the local station L after completing the data transmission to the slave stations m1 and m2 (Step S290). The local station L receives the token from the management master station M (Step S300).

The MAC-address determining unit 14 of the local station L determines whether the received token is destined to the own station (the local station L) (Step S310). When the received token is destined to the own station (YES at Step S310), the data transmitting/receiving unit 12 of the local station L transmits data to the slave stations 11 and 12 (Step S320). Upon completing the data transmission to the slave stations 11 and 12, the local station L transmits a token to the management master station M, thereby releasing the token (Step S330). Thereafter, the local station L waits for a token transmitted next.

The slave station m2 receives the data transmitted from the management master station M in the process at Step S280 (Step S340). Thereafter, the slave station m2 waits for a token destined to the own station transmitted from another station. Upon receiving a token destined to the own station (Step S350), the slave station m2 transmits data to the management master station M (Step S360). Upon completing the data transmission to the management master station M, the slave station m2 transmits a token to the management master station M, thereby releasing the token (Step S380). When the token is transmitted to the management master station M, the slave station m2 according to the present embodiment transmits the token by setting the data update flag in the token ON. After releasing the token, the slave station m2 waits for a token transmitted next.

In the local station L, when the token received in the process at Step S300 is not destined to the own station (NO at Step S310), the MAC-address determining unit 14 of the local station L determines whether the received token is destined to the management master station M (Step S390).

When the received token is not a MAC address of the management master station M (NO at Step S390), the local station L waits for a token transmitted next. When the received token is a MAC address of the management master station M (YES at Step S390), the data-update-flag determining unit 15 determines whether a data update flag in the token is ON (Step S400).

When a data update flag is OFF (OFF at Step S400), the local station L waits for a token transmitted next. On the other hand, when a data update flag is ON (ON at Step S400), the data-update processing unit 11 of the local station L updates data (Step S410).

In the present embodiment, when a token transmitted from the slave station m2 to the management master station M is received, the local station L determines that the received token is not destined to the own station but is destined to the management master station M and that a data update flag is ON. Therefore, when a token transmitted from the slave station m2 to the management master station M is received, the local station L updates data.

Upon completing the data update, the local station L waits for a token transmitted next. The local station L repeats the processes at Steps S300 to S330 and the processes at Steps S390 to S410 each time when receiving a token from another station.

After releasing the token at Step S290, the management master station M waits for a token transmitted next. When there is data transmission from the slave stations m1 and m2 to the management master station M during this time, the management master station M receives the data from the slave stations m1 and m2. Because the slave station m2 transmits the data to the management master station M in the process at Step S360, the management master station M receives the data from the slave station m2 (Step S420).

Thereafter, upon receiving a token from another station (Step S430), the management master station M determines whether a token-determination MAC address of the received token is a MAC address of the own station (Step S440).

When the received token is not a MAC address of the own station (NO at Step S440), the management master station M waits for a token transmitted next. When the received token is a MAC address of the own station (YES at Step S440), the management master station M determines whether a data update flag of the received token is ON (Step S450). When a data update flag of the received token is OFF (OFF at Step S450), the management master station M waits for a token transmitted next. When a data update flag of the received token is ON (ON at Step S450), the management master station M updates data (Step S460).

Because the data update flag of the token transmitted from the slave station m2 is ON, the management master station M updates data when the token from the slave station m2 is received. The local station L also updates data when a data update flag of a token transmitted from the slave station m2 is ON, in a similar manner to that of the management master station M. Therefore, a data update by the management master station M (Step S460) is performed at the same timing as that of a data update by the local station L (Step S410).

Upon completing the data update, the management master station M waits for a token transmitted next. The management master station M repeats the processes at Steps s430 to S460 and the processes at Steps S280, S290, and S420 at each time of receiving a token from another station.

In the data communication system 100, after the lookup phase, the processes at Steps S300 to S330, S390 to S410 by the local station L and the processes at Steps S280, S290, S420 to S460 by the management master station M are repeated as a token phase.

As described above, according to the second embodiment, the management master station M and the local station L synchronously update data when a token of which a data update flag is ON is transmitted to the management master station M. Therefore, various token circulations can be set as one token circulation.

INDUSTRIAL APPLICABILITY

As described above, the data communication system and the data communication device according to the present invention are suitable for data communications between a master station and a slave station.

The invention claimed is:

1. A data communication system comprising: a master station that performs transmission and reception of data to and from a slave station by token passing and performs a data update of the data by an arithmetic operation of data transmitted and received to and from the slave station; and the slave station, wherein the master station includes:
a first master station that performs management in the data communication system and updates data of at least one predetermined slave station; and
a second master station that updates data of at least one slave station that is different from a slave station the first master station updates, and
the first and second master stations update data substantially simultaneously when a token frame destined to the first master station is multicast from one of the predetermined slave stations to both the first master station and the second master station.

2. The data communication system according to claim 1, wherein
the second master station includes:
a destination determining unit that determines a destination of a token frame transmitted from the slave station; and
a data-update processing unit that performs the data update when the destination determining unit determines that a destination of the token frame is the first master station.

3. The data communication system according to claim 2, wherein
the first master station performs a data update when a token frame destined to the first master station and having update permission information of permitting a data update is received,
the second master station further includes a permission determining unit that determines whether a token frame transmitted from the slave station has the update permission information, and
the data-update processing unit performs the data update when the destination determining unit determines that a destination of the token frame is the first master station and also when the permission determining unit determines that a token frame transmitted from the slave station has update permission information.

4. The data communication system according to claim 1, wherein the token frame is set with a circulation order such that the token frame is transmitted to each of the slave stations after being transmitted to the first master station and the second master station.

5. The data communication system according to claim 1, wherein the first and second master stations simultaneously start a next data transmission process to be performed after a data update.

6. A data communication device of a local station that performs transmission and reception of data to and from a slave station by token passing using a data communication system and performs a data update of the data by an arithmetic operation of data transmitted and received to and from the slave station, the data communication device comprising:
 a destination determining unit that determines a destination of a token frame transmitted from the slave station; and
 a data-update processing unit that performs the data update using multicast communications to both the local station and a master station when the destination determining unit determines that a destination of the token frame is the master station that performs management in the data communication system and updates data of a predetermined slave station that is different from the slave station of which data the data communication device updates.

7. The data communication system according to claim 1, wherein the first master station notifies the second master station of the first master station's MAC address prior to the multicast communication.

8. The data communication system according to claim 7, wherein when the received token frame is destined to only the second master station, the second master station transmits data to its slave stations.

* * * * *